2,963,046

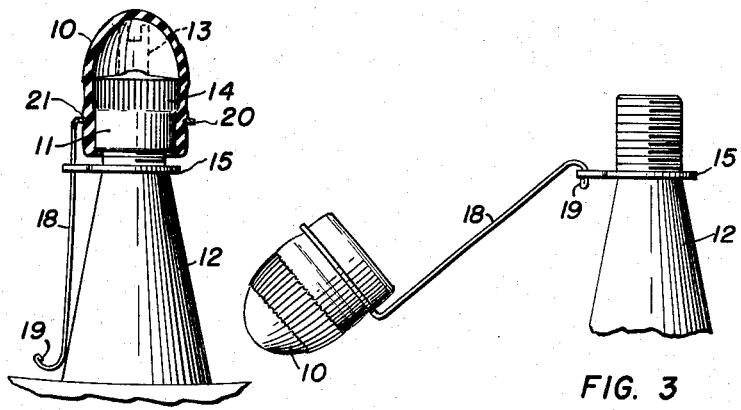
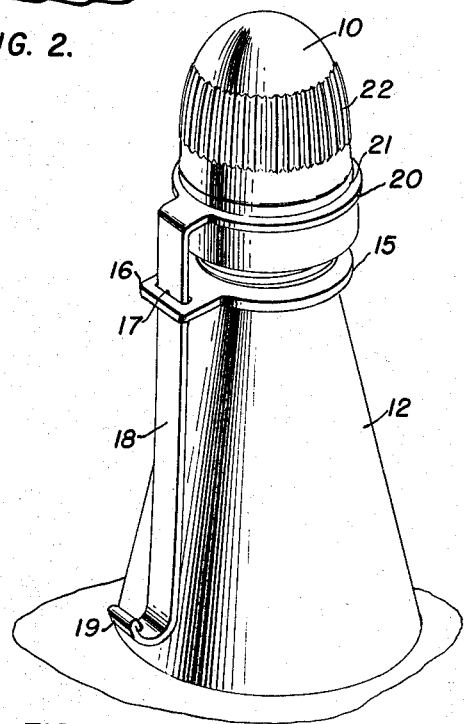
FIG. 2.
FIG. 3
FIG. 1.
DAVID E. GOODRICH
INVENTOR.
BY *Herbert J. Brown*
ATTORNEY

United States Patent Office 2,963,046
Patented Dec. 6, 1960

COVER FOR TIRE VALVE CAP

David E. Goodrich, 4117 Angus Drive,
Fort Worth 16, Tex.

Filed Dec. 17, 1957, Ser. No. 703,296

1 Claim. (Cl. 138—89.2)

This invention relates to pneumatic tires and has reference to a cover for valve stem caps.

An object of the invention is to provide means to prevent losing or misplacing valve stem caps, particularly when servicing the tire on which the cap is ordinarily used.

Another object is to provide a resilient cover for the described purpose, and which cover is capable of receiving and fitting conventional valve stem caps such as those now in use.

Another object is to provide a valve stem cap or cover, though linked with the valve stem, which is accessible and convenient in use.

A further object is to provide means linking a cap with a valve stem, and which means will not vibrate while the wheel and tire are turning.

A further object is to provide linkage means, as referred to, which will cause very little wind resistance on a turning wheel.

These and other objects will become apparent from the following description and accompanying drawing, wherein:

Figure 1 is an enlarged view of a tapered valve stem and cap cover mounted thereon in accordance with the invention.

Figure 2 is an elevation of a valve stem and cap, and showing the cover of the invention mounted thereon, said cover being shown in section.

Figure 3 is a view similar to Figure 2, but showing the cover in elevation and removed from the valve stem.

The form of the invention shown includes a domed cover 10 of resilient material, such as rubber or nylon, and which cover is open at one end to receive the circumference of a conventional cap 11 adapted to be threadedly engaged on a tapered valve stem 12. The cap 11 may include a slotted projection 13 for installing and removing valve cores, and it will be noted that the cover 10 is of sufficient height to accommodate such projection. The cover 10 is a press fit on the cap 11 and whereby the inner surface of the cover grips the cap serrations 14.

A feature of the invention is directed to means linking the cover 10 and cap 11 contained therein with the valve stem 12. There is a retaining ring 15 around the upper end of the valve stem 12 and which ring is either threaded or pressed in place at a position beneath the cap 11. A lateral projection 16 on one side of the ring 15 has a narrow opening 17 slidably receiving an elongated flat spring 18, one end of which is outwardly curved, as in Figure 2, and the extreme end of which is sharply bent to provide a stop 19. The remaining end of the spring 18 is inwardly directed where it terminates in the form of a circle or collar 20 for rotatable engagement in a groove 21 in the circumference of the cover 10 near the open end thereof. Longitudinal serrations 22 in the surface of the cover 10 provide gripping means when screwing or unscrewing the cap 11. The length of the spring 18 and the spacing of the slot 17 in the ring projection are such that the curved end of the spring bears against the tapered valve stem when the cap 11 is in place. Preferably, the ring slot 17 is positioned perpendicular to the axis of the tire and whereby the edge to the spring 18 presents a narrow surface when the wheel is turning and thereby reduces wind resistance.

The invention is not limited to the exemplary construction herein shown and described, but may be varied within the scope of the appended claim.

What is claimed is:

In combination with a tapered valve stem, a cover assembly including a valve stem cap threadedly engaged on the extending end of said valve stem, said cover assembly comprising: a cup shaped cover of resilient material pressed on said cap, a retaining ring around the extending end of said valve stem and inwardly of the threads thereon, said ring including a lateral projection on one side thereof, said projections having a narrow opening therethrough, the longitudinal axis of said opening being perpendicular to the axis of said valve stem, said opening being located inwardly of the outer extremity of the base of said valve stem, said cover including a circular groove therearound and in the surface thereof intermediate its ends, a collar rotatably received in said groove, an elongate flat spring slidably received through said opening in said ring and integral at one end thereof with said collar, the remaining portion of said spring extending toward the base of said valve stem and its remote end being in contact with the tapered surface thereof, said spring including an outwardly bent stop at its remote end for hinged engagement in said projection.

References Cited in the file of this patent
UNITED STATES PATENTS

| 577,122 | Washburn | Feb. 16, 1897 |
| 1,512,662 | Atkinson et al. | Oct. 21, 1924 |

FOREIGN PATENTS

| 519,291 | Germany | Feb. 5, 1931 |